(12) United States Patent
Schmier, II

(10) Patent No.: US 9,579,856 B2
(45) Date of Patent: Feb. 28, 2017

(54) METHODS AND APPARATUS FOR MOLDING AND JOINING COMPOSITE PARTS

(71) Applicant: The Boeing Company, Chicago, IL (US)

(72) Inventor: Mark A. Schmier, II, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 17 days.

(21) Appl. No.: 14/469,158

(22) Filed: Aug. 26, 2014

(65) Prior Publication Data

US 2014/0360667 A1 Dec. 11, 2014

Related U.S. Application Data

(63) Continuation-in-part of application No. 13/683,763, filed on Nov. 21, 2012, now Pat. No. 8,844,599, which is a continuation of application No. 11/747,506, filed on May 11, 2007, now Pat. No. 8,337,654.

(51) Int. Cl.
| | |
|---|---|
| *B29C 70/68* | (2006.01) |
| *B29C 33/48* | (2006.01) |
| *H01Q 1/28* | (2006.01) |
| *B29C 70/84* | (2006.01) |
| *B29D 99/00* | (2010.01) |

(Continued)

(52) U.S. Cl.
CPC ............ *B29C 70/84* (2013.01); *B29C 33/306* (2013.01); *B29C 70/681* (2013.01); *B29D 99/001* (2013.01); *H01Q 1/28* (2013.01); *B29L 2031/773* (2013.01); *Y10T 156/10* (2015.01)

(58) Field of Classification Search
CPC ..... B29C 70/681; B29C 70/682; B29C 70/84; B29C 33/306; B29C 33/30; B29C 33/301; B29C 33/302; B29L 2031/3456; B29L 2031/773; B64C 1/36; H01Q 1/281; H01Q 1/368; H01Q 1/405; H01Q 1/42
See application file for complete search history.

(56) References Cited

U.S. PATENT DOCUMENTS

| | | |
|---|---|---|
| 231,508 A | 8/1880 | Thompson |
| 3,128,724 A | 4/1964 | Linder |

(Continued)

OTHER PUBLICATIONS

United States Patent and Trademark Office, "Restriction Requirement," issued in connection with U.S. Appl. No. 11/747,506, on Apr. 27, 2009 (8 pages).

(Continued)

*Primary Examiner* — William Bell
(74) *Attorney, Agent, or Firm* — Hanley, Flight & Zimmerman, LLC

(57) ABSTRACT

Methods and apparatus for molding and joining composite parts are disclosed herein. An example method includes positioning a base mandrel over a tool base, laying up plies of material over the base mandrel and the tool base to form a support structure base layup, curing the support structure base layup to form a support structure base, removing the support structure base from the tool base and the base mandrel, and configuring the support structure base to be a first support structure for use with a first radar assembly or a second support structure for use with a second radar assembly.

18 Claims, 10 Drawing Sheets

(51) Int. Cl.
  *B29C 33/30* (2006.01)
  *B29L 31/00* (2006.01)

(56) References Cited

U.S. PATENT DOCUMENTS

| | | | |
|---|---|---|---|
| 3,336,873 | A | 8/1967 | Wilford |
| 3,484,901 | A | 12/1969 | Anderson |
| 3,883,109 | A | 5/1975 | Hahne |
| 3,939,024 | A | 2/1976 | Hoggatt |
| 4,158,910 | A | 6/1979 | Hanas et al. |
| 4,162,496 | A | 7/1979 | Downen et al. |
| 4,551,084 | A | 11/1985 | Lake |
| 5,320,700 | A | 6/1994 | Hall et al. |
| 5,393,479 | A | 2/1995 | Nadeau |
| 5,547,629 | A * | 8/1996 | Diesen .................. B29C 33/505 264/257 |
| 5,746,553 | A | 5/1998 | Engwall |
| 5,824,249 | A | 10/1998 | Leitch et al. |
| 5,871,683 | A | 2/1999 | Schaper et al. |
| 6,012,883 | A | 1/2000 | Engwall et al. |
| 6,168,358 | B1 | 1/2001 | Engwall et al. |
| 6,519,876 | B1 | 2/2003 | Geer et al. |
| 6,592,788 | B1 | 7/2003 | Yamamoto et al. |
| 6,796,784 | B1 | 9/2004 | Andre |
| 8,337,654 | B2 | 12/2012 | Schmier, II et al. |
| 2006/0108058 | A1 | 5/2006 | Chapman et al. |
| 2006/0170127 | A1 | 8/2006 | Hirayama et al. |
| 2007/0063378 | A1 | 3/2007 | O'Donoghue |
| 2007/0096359 | A1 | 5/2007 | Torfs et al. |
| 2008/0277058 | A1 | 11/2008 | Schmier, II et al. |
| 2014/0060741 | A1 | 3/2014 | Schmier, II et al. |

OTHER PUBLICATIONS

United States Patent and Trademark Office, "Non-Final Office Action," issued in connection with U.S. Appl. No. 11/747,506, on Jun. 17, 2009 (15 pages).

United States Patent and Trademark Office, "Final Office Action," issued in connection with U.S. Appl. No. 11/747,506, on Dec. 16, 2009 (15 pages).

United States Patent and Trademark Office, "Advisory Action," issued in connection with U.S. Appl. No. 11/747,506, on Mar. 15, 2010 (3 pages).

United States Patent and Trademark Office, "Non-Final Office Action," issued in connection with U.S. Appl. No. 11/747,506, on Jan. 10, 2011 (17 pages).

United States Patent and Trademark Office, "Final Office Action," issued in connection with U.S. Appl. No. 11/747,506, on Jun. 1, 2011 (17 pages).

United States Patent and Trademark Office, "Non-Final Office Action," issued in connection with U.S. Appl. No. 11/747,506, on Dec. 16, 2011 (17 pages).

United States Patent and Trademark Office, "Final Office Action," issued in connection with U.S. Appl. No. 11/747,506, on May 17, 2012 (20 pages).

United States Patent and Trademark Office, "Notice of Allowance," issued in connection with U.S. Appl. No. 11/747,506, on Aug. 24, 2012 (11 pages).

United States Patent and Trademark Office, "Non-Final Office Action," issued in connection with U.S. Appl. No. 13/683,763, on Oct. 28, 2013 (14 pages).

United States Patent and Trademark Office, "Final Office Action," issued in connection with U.S. Appl. No. 13/683,763, on Mar. 28, 2014 (9 pages).

United States Patent and Trademark Office, "Notice of Allowance," issued in connection with U.S. Appl. No. 13/683,763, on May 27, 2014 (8 pages).

Reinhart, Theodore J., "Overview of Composite Materials," Handbook of Composites, Springer-Verlag, 1998 (16 pages).

* cited by examiner

METHODS AND APPARATUS FOR MOLDING AND JOINING COMPOSITE PARTS

CROSS-REFERENCE TO RELATED APPLICATIONS

This application is a continuation-in-part of U.S. patent application Ser. No. 13/683,763, filed on Nov. 21, 2012, entitled CONFIGURABLE TOOLING AND MOLDING METHOD USING THE SAME, which is a continuation of U.S. patent application Ser. No. 11/747,506, filed on May 11, 2007, entitled "CONFIGURABLE TOOLING AND MOLDING METHOD USING THE SAME", now U.S. Pat. No. 8,337,654. U.S. patent application Ser. Nos. 13/683,763 and 11/747,506 are both hereby incorporated by reference in their entities.

FIELD

The present disclosure relates generally to fabrication of composite parts and, more particularly, to apparatus and methods for molding and joining composite parts.

BACKGROUND

Layup tooling is typically employed to fabricate composite components or parts. Specifically, composite parts are typically fabricated by laying up multiple plies of fiber reinforced resin that is formed or molded into particular shapes using the layup tooling. Often, composite parts include various or different features. Minor variations in part features require an entirely new set of layup tooling, which can significantly increase manufacturing costs to fabricate the parts with various or differing features.

SUMMARY

An example apparatus disclosed herein includes a tool base and a base mandrel removably coupled to the tool base, where the tool base and the base mandrel form a support structure base for a first radar assembly or a second radar assembly. A first part mandrel interchangeable with the base mandrel is removably coupled to the tool base, where the first part mandrel has first features to support a first antenna module during assembly of the first radar assembly. A second part mandrel interchangeable with the base mandrel is removably coupled to the tool base, where the second part mandrel having second features to support a second antenna module during assembly of the second radar assembly.

An example method disclosed herein includes positioning a base mandrel over a tool base, laying up plies of material over the base mandrel and the tool base to form a support structure base layup, curing the support structure base layup to form a support structure base, removing the support structure base from the tool base and the base mandrel, and configuring the support structure base to a first support structure for use with a first radar assembly or a second support structure for use with a second radar assembly.

Another example method disclosed herein includes coupling a base mandrel to a tool base to form a first support structure of a first radar assembly or a second support structure of a second radar assembly, where the first support structure is different than the second support structure. The method includes selecting a first part mandrel or a second part mandrel, interchanging the selected first part mandrel or the second mandrel with the base mandrel, selecting a first antenna module corresponding to the first support structure or a second antenna module corresponding to the second support structure, positioning the selected first antenna module or the second antenna module over the first support structure or the second support structure, positioning a radome over the first support structure or the second support structure and the first antenna module or the second antenna module, and bonding the first support structure, the first antenna module and the radome to form a first antenna assembly or bonding the second support structure, the second antenna module and the radome to form a second antenna module.

Another example method disclosed herein includes positioning a base mandrel over a tool base, laying up plies of material over the base mandrel and the tool base to form a support structure base layup, curing the support structure base layup to form a first support structure base, removing the support structure base from the tool base and the base mandrel, and removing the base mandrel from the tool base.

The features, functions and advantages that have been discussed can be achieved independently in various embodiments or may be combined in yet other embodiments further details of which can be seen with reference to the following description and drawings.

Figure 1:
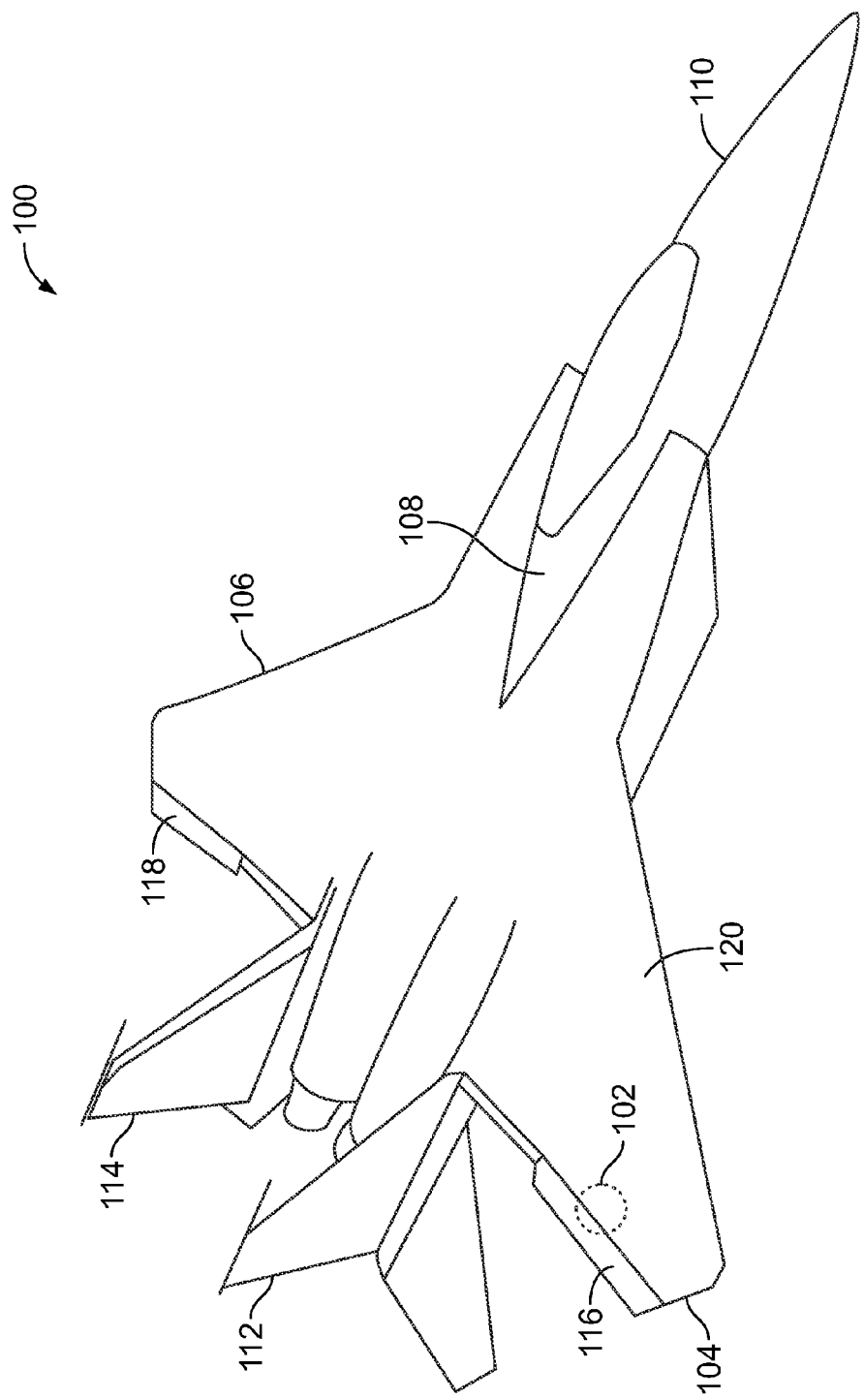
FIG. 1 illustrates an example aircraft having an example radar assembly constructed in accordance with the teachings disclosed herein.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in direct contact with another part means that there is no intermediate part between the two parts.

DESCRIPTION

The example methods and apparatus disclosed herein enable manufacture and/or assembly of common parts having differing or various features with minimal changes in tooling. For example, the example tooling disclosed herein includes a set of standard or common tools used to produce, fabricate or manufacture a common part or structure of an assembly and one or more interchangeable tools that are used to modify the common part to include different features. Additionally or alternatively, the standard set of tooling and/or the interchangeable tools may be used to support the common parts with varying or different features during an assembly. The interchangeable tooling may include, for example, mandrels and/or inserts that can be used with the standard tool set for producing parts having common features such as similar (e.g., identical) shapes, but varying details (e.g., different antenna modules). The methods and apparatus disclosed herein eliminate the need to duplicate an entire set of tools to fabricate a part, thereby reducing manufacturing costs.

The example methods and apparatus may be employed to fabricate and/or assemble aircraft components or parts. For example, the example methods and apparatus may be employed to fabricate and/or assemble a radar assembly for use with an aircraft. More specifically, the example methods and apparatus disclosed herein may be used to fabricate a first radar assembly and a second radar assembly, where the first and second radar assemblies have a common shape or components (e.g., a support structure and/or radome), but have different details (e.g., such as different antenna modules). For example, the example methods and apparatus disclosed herein may be used to fabricate a support structure and/or a radome of a radar assembly. In some examples, the example methods and apparatus disclosed herein may be used to assemble a support structure, an antenna module and a radome of a radar assembly.

In some examples, the example methods and apparatus disclosed herein include a base tool (e.g., a common tool part) and a plurality of mandrels that are interchangeable with the base tool to form different radar assemblies having common structures, but different features (e.g., avionics). For example, a plurality of mandrels disclosed herein may include a base mandrel, a first part mandrel and a second part mandrel that are interchangeable with a base tool to form and/or assemble the different radar assemblies. In some examples, the base tool and the base mandrel are used to form a support structure base. When the support structure base is formed, the base mandrel may be interchanged with the first part mandrel to configure the support structure base to be a first support structure for use with a first radar assembly. For example, the support structure base may be configured to receive a first antenna module having a first set of lands or avionic components. Alternatively, the base mandrel may be interchanged with the second part mandrel to configure the support structure base to be a second support structure for use with a second radar assembly different than the first radar assembly. For example, the support structure base may be configured to receive a second antenna module having a second set of lands or avionic components different (e.g., having a different shape or geometry, dimensions (length, height, diameter), etc.) than the lands or avionics of the first antenna module.

FIG. 1 illustrates an example aircraft 100 having a radar assembly 102 constructed in accordance with the teachings disclosed herein. Referring to FIG. 1, the aircraft 100 includes right and left wings 104, 106 extending laterally outward from a fuselage 108. The example radar assembly 102 disclosed herein may be mounted to the wings 104, 106, the fuselage 108, a nose cone 110, fins 112, 114, wing flaps 116, 118 and/or any other surface of the example aircraft 100. For example, the radar assembly 102 may be flush mounted with a skin or exterior surface 120 of the wings 104, 106, the fuselage 108, the nose cone 110, the fins 112, 114, the wing flaps 116, 118 etc. For example, the radar assembly 102 may form a portion of an exterior skin of the wings 104, 106, the fuselage 108, the nose cone 110, the fins 112, 114, the wing flaps 116, 118, and/or any other surface of the aircraft 100. In some examples, the radar assembly 102 may be mounted within a frame of the aircraft 100, the wings 104, 106, the fuselage 108, the nose cone 110, the fins 112, 114, the wing flaps 116, 118 and/or behind a surface of the wings 104, 106, the fuselage 108, the nose cone 110, the fins 112, 114, the wing flaps 116, 118 and/or any other surface of the aircraft 100.

Figure 2A:
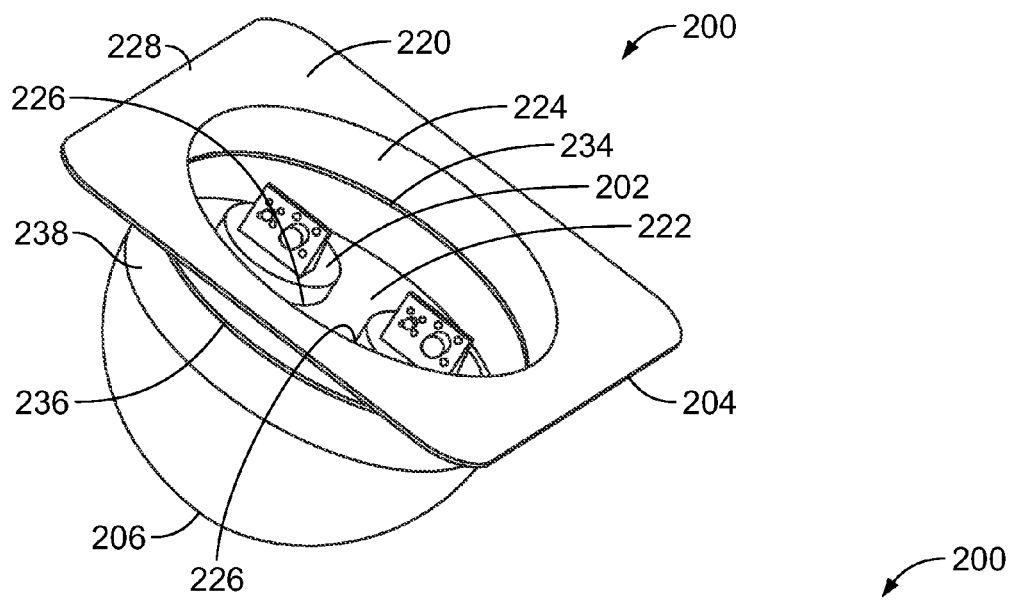
FIG. 2A illustrates an example radar assembly constructed in accordance with the teachings disclosed herein.
Figure 2B:
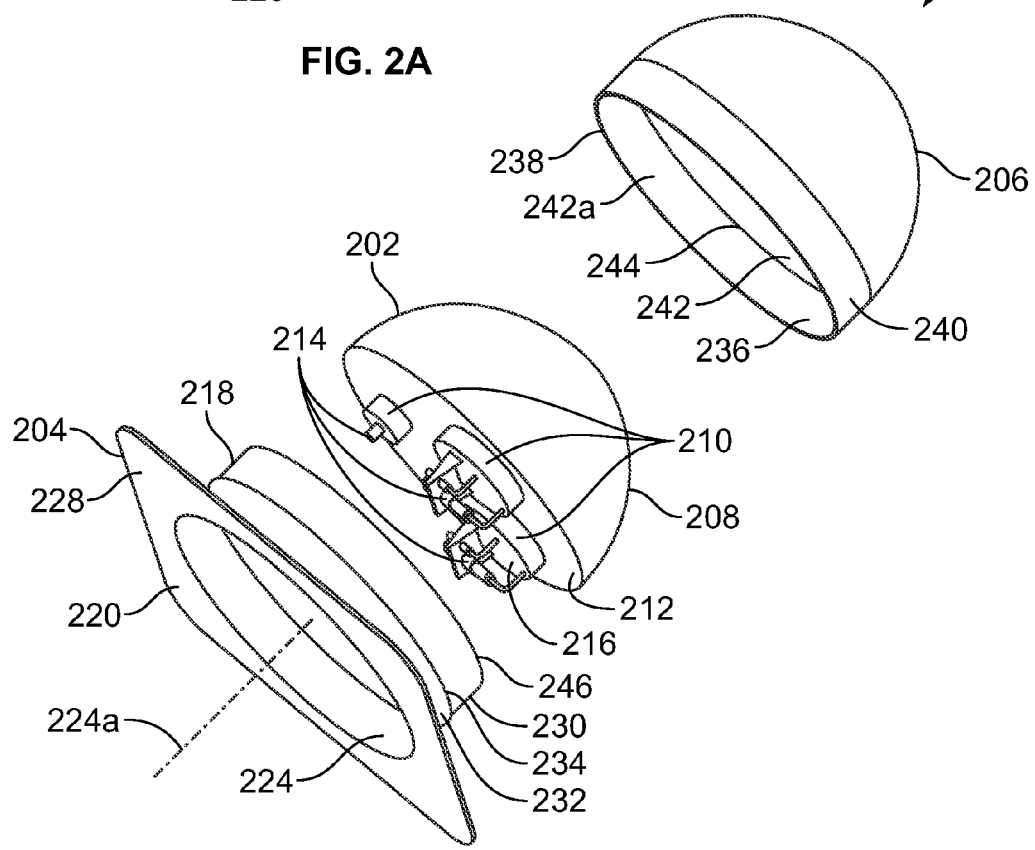
FIG. 2B illustrates an exploded view of the example radar assembly of FIG. 2A
Figure 3A:
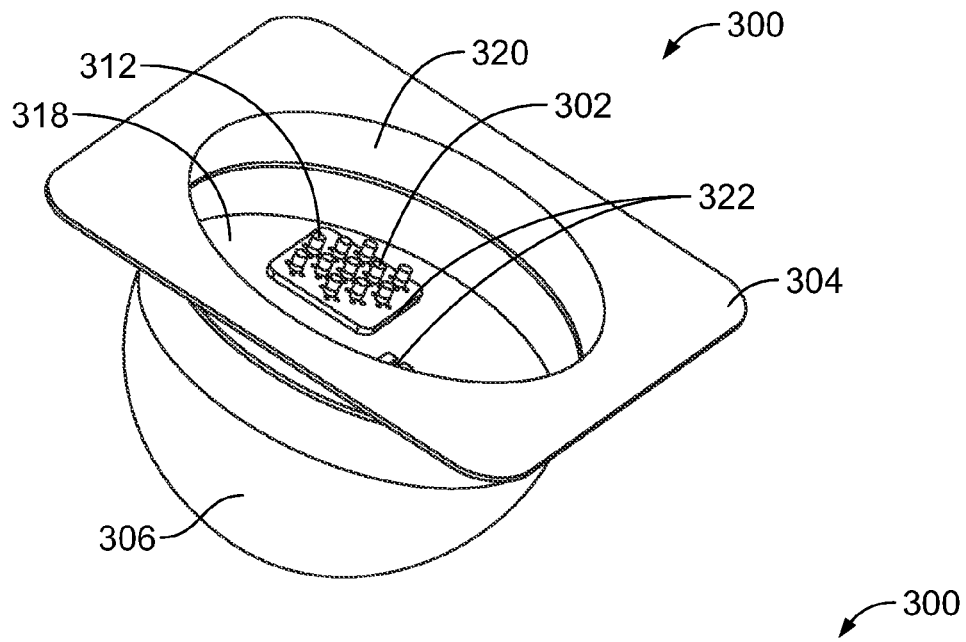
FIG. 3A illustrates another example radar assembly constructed in accordance with the teachings disclosed herein.
Figure 3B:
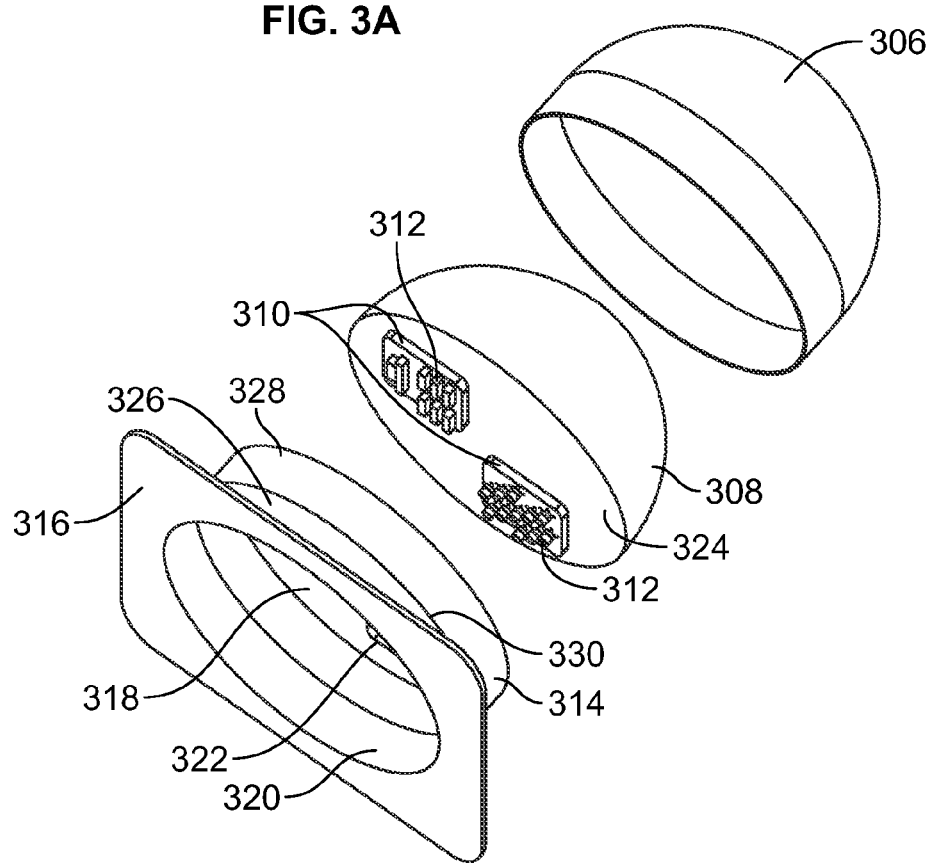
FIG. 3B illustrates an exploded view of the example radar assembly of FIG. 3A

FIG. 2A illustrates an example radar assembly 200 constructed in accordance with the teachings disclosed herein. FIG. 2B is an exploded view of the example radar assembly 200 of FIG. 2B. Referring to FIGS. 2A and 2B, the example radar assembly 200 of the illustrated example includes an antenna module 202, a frame or support structure 204, and a radome 206. More specifically, the antenna module 202 is mounted to the support structure 204 and is covered or protected (e.g., encased or enclosed) by the radome 206. The antenna module 202 of the illustrated example has a body 208 that includes one or more raised lands 210 protruding from a surface 212 of the antenna module 202 to support one or more circuit boards and/or electronic components 214 (e.g., avionics) of the radar assembly 200. In other words, a surface 216 of the lands 210 is offset or raised relative to the surface 212 of the body 208. In the illustrated example, the lands 210 of the example antenna module 202 have cylindrically-shaped profiles. However, in other examples (e.g., as shown in FIGS. 3A and 3B), the lands 210 may have any other shape or profile and/or any number of lands 210 may be provided (e.g., one, two, three, etc). Further, the body 208 of the antenna module 202 of the illustrated example has a hemi-spherical shape or profile and the surface 212 has a circular shape or profile. However, in other examples, the body 208 and/or the surface 212 of the antenna module 202 may have a square shape, an oval shape, and/or any other shape(s) or profile(s).

The support structure 204 of the illustrated example includes a wall 218 and a base or flange 220. The wall 218 and a wall or bottom surface 222 (i.e., a surface offset relative to the flange 220) of the example support structure 204 define a recess or cavity 224. The bottom surface 222 of the example support structure 204 of FIGS. 2A and 2B is complementary to the surface 212 of the antenna module 202. Thus, the bottom surface 222 has a shape or profile that is similar or complementary to the shape or profile of the surface 212 of the antenna module 202. For example, the bottom surface 222 has a circular profile or shape similar to the profile or shape of the surface 212 of the antenna module 202. Further, the bottom surface 222 of the illustrated example includes openings 226 shaped complementary to the shape or profile of the raised lands 210 of the antenna module 202. In this manner, the openings 226 receive (e.g., matably receive) at least portions of the respective lands 210 of the antenna module 202, when the antenna module 202 is coupled to the support structure 204. In other words, the openings 226 formed in the bottom surface 222 of the support structure 204 are complementary and/or match the number of raised lands 210 and/or the cross-sectional shape or profile (e.g., a geometric shape) of the lands 210 of the antenna module 202.

The flange 220 and the wall 218 are integrally formed as a unitary structure as discussed in greater detail below. The flange 220 of the illustrated example has a rectangular shape or profile and the wall 218 of the illustrated example has a cylindrical shape or profile. However, in other examples, the flange 220 and/or the wall 218 may have any other shapes or profiles. In some examples, the flange 220 of the support structure 204 may be flush mounted with an exterior skin or surface of an example aircraft (e.g., the exterior surface or skin 120 of the example aircraft 100 of FIG. 1). Thus, a surface 228 (e.g., an upper or outer) of the flange 220 may define a portion of the exterior surface or the skin 120 of the aircraft 100.

Further, the wall 218 of the example support structure of FIGS. 2A and 2B includes a reduced or stepped wall portion 230 (e.g., a reduced diameter portion) and a non-reduced wall portion 232 to form a shoulder 234 on the wall 218. In other words, an inner diameter of the wall 218 or the cavity 224 defined by the non-reduced wall portion 232 is greater than an inner diameter of the wall 218 of the cavity 224 defined by the reduced wall portion 230. The wall 218 extrudes a length from the flange 220 in a direction along a longitudinal axis 224a of the cavity 224, where the non-reduced wall portion 232 projects a first length from the flange 220 and the reduced wall portion 230 projects a second length from the non-reduced wall portion 232.

The radome 206 of the illustrated example forms an enclosure that protects the antenna module 202. The radome 206 of the illustrated example is formed from material(s) that minimally attenuate signals (e.g., electromagnetic signals) transmitted or received by the antenna module 202. Thus, the radome 206 may be formed from any suitable material that is transparent to radio waves (e.g., fiberglass, PTFE-coated fabric, etc.). The radome 206 of the illustrated example includes a body 240 defining an opening or a cavity 242. The body 240 has a shape complementary to the shape of the body 208 of the antenna module 202. Thus, in the illustrated example the radome 206 has a hemi-spherical shape. However, in other examples, the radome 206 may have any other suitable shape. The radome 206 of the illustrated example includes an offset or marginal area 236 that overlaps the reduced wall portion 230 of the support structure 204 such that an edge 238 of the radome 206 engages or abuts the shoulder 234 of the support structure 204 when the radome 206 is coupled to the support structure 204. As a result, an outer surface 240 of the radome 206 is substantially flush and/or aligned with an outer surface of the non-reduced portion 232 of the wall 218 when the radome 206 is coupled to the support structure 204. Further, the offset or marginal area 236 and a surface 242a of the cavity 242 (e.g., the surface 242a defining an inner surface of the marginal area 236) of the radome 206 defines a step or shoulder 244 that an edge 246 of the reduced portion 230 of the wall 218 engages or abuts when the radome 206 is coupled to the support structure 204. Further, the example radome 206 of the illustrated example may be formed with the example apparatus and methods disclosed herein. Alternatively, the radome 206 may be pre-fabricated or formed via other example manufacturing process(es) or technique(s) and may be assembled with the support structure 204 after the radome 206 is fabricated.

FIG. 3A illustrates another example radar assembly 300 constructed in accordance with the teachings disclosed herein. FIG. 3B is an exploded view of the example radar assembly 300 of FIG. 3B. The radar assembly 200 of FIGS. 2A and 2B and the radar assembly 300 FIGS. 3A and 3B have common parts or structures that include surfaces with different or varying features. For example, the example radar assembly 300 of FIGS. 3A and 3B includes an antenna module 302, a support structure 304 and a radome 306. The antenna module 302 of the illustrated example includes a body 308 that includes raised lands 310 to support electrical components and/or printed circuit boards 312 (e.g. avionics) of the antenna module 302. The body 308 of the example antenna module 302 of the illustrated example is substantially similar to the body 208 of the example antenna module 202 of FIGS. 2A and 2B except that the lands 310 of the antenna module 302 have a profile or shape that is different than the profile or shape of the lands 210 of the example antenna module 202 (e.g., varying or differing features). For example, the lands 310 of the illustrated example have a square profile or shape.

Likewise, the support structure 304 of the illustrated example includes a wall 314 and a base or flange 316. As shown, the wall 314 and a bottom wall or surface 318 of the support structure 304 define a cavity 320. The flange 316, the wall 314 and the bottom surface 318 of the example support structure 304 of FIGS. 3A and 3B are substantially similar to the example flange 220, the wall 218 and the bottom surface 222 of the example support structure 204 of FIGS. 2A and 2B except that the bottom surface 318 of the illustrated example includes openings 322 having shapes or profiles complementary to the shapes or profiles of the respective lands 310 of the antenna module 302. Thus, the bottom surface 318 has a shape or profile that is similar or complementary to a surface 324 of the antenna module 302. In this manner, the openings 322 receive (e.g., matably receive) at least portions of the lands 310 of the antenna module 302, when the antenna module 302 is coupled to the support structure 304. In other words, the openings 322 formed in the bottom surface 318 of the support structure 304 match the number of raised lands 310 and/or the shapes or profiles (e.g., a geometric shape) of the lands 310 of the antenna module 302. The wall 314 of the illustrated example includes a non-reduced wall portion 326 and a reduced wall portion 328 to define a shoulder 330. The flange 316 and the wall 314 are integrally formed as a unitary structure as discussed in greater detail below. Thus, the example support structure 204 of FIGS. 2A and 2B and the example support structure 304 of FIGS. 3A and 3B are substantially similar except for the openings 226 and 322 in the respective bottom surfaces 222 and 318 to accommodate different features (e.g., the lands 210 and 310, respectively) of the respective example antenna modules 202 and 304 of FIGS. 2A, 2B, 3A and 3B. Additionally, the radome 306 of the example radar assembly 300 is identical (e.g., interchangeable) with the example radome 206 of FIGS. 2A and 2B.

The example radar assembly 200 of FIGS. 2A and 2B, or the example radar assembly 300 of FIGS. 3A and 3B may be used to implement the example radar assembly 102 of the example aircraft 100 of FIG. 1. Although the examples in the figures illustrate radar assemblies or components, the example methods and apparatus disclosed herein may be employed with any parts and/or part assemblies having common parts, but having surfaces with different or varying features.

Figure 4A:
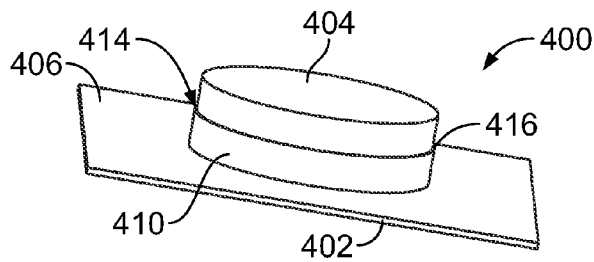
FIG. 4A illustrates an example bond tool assembly for manufacturing an example support structure of the example radar assemblies of FIGS. 2A, 2B, 3A and 3B.
Figure 4B:
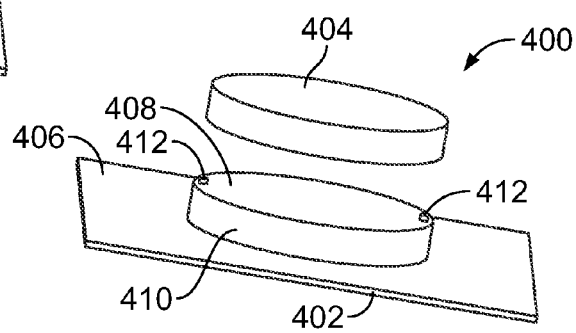
FIG. 4B illustrates the example bond tool assembly of FIG. 4A in a non-assembled state.

FIG. 4A illustrates an example bond jig 400 to form the example support structures 204 and 304 disclosed herein. FIG. 4B is an exploded view of the example bond jig 400 of FIG. 4A. More specifically, the example bond jig 400 includes a tool base 402 and a base mandrel 404 that form common features of the example support structure 204 of FIGS. 2A and 2B and the example support structure 304 shown in FIGS. 3A and 3B. The tool base 402 and the base mandrel 404 of the illustrated example provide layup tooling that may be used to fabricate or form parts (e.g., the support structure 204 or 304) having a generally similar shape, but with variations in certain features or details (e.g., the openings 226 or 322). For example, the tool base 402 and the base mandrel 404 form the flanges 220, 316, the walls 218, 314, and the bottom surfaces 222, 318 of the example support structures 204, 304 without the openings 226, 322 of the respective bottom surfaces 222, 318. In other words, the bond jig 400 forms a support structure base 600 of FIG. 6 having common features (e.g., the flanges 220, 316, the walls 218, 314 and/or the bottom surfaces 222, 318).

Figure 6:
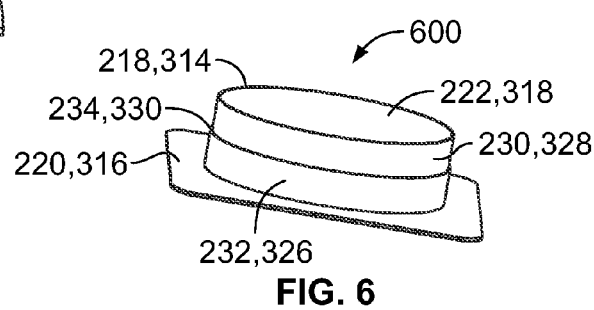
FIG. 6 illustrates an example support structure base formed by the example bond tool assembly of FIGS. 4A and 4B.

Referring to FIGS. 4A and 4B, the tool base 402 of the illustrated example includes a first surface or portion 406 and a second surface or portion 408 to form or manufacture the support structure base 600 of FIG. 6. More specifically, the first surface 406 has a shape complementary to the flanges 220, 316 of the respective support structures 204 and 304 and the second surface 408 has a shape or profile that is complementary to the non-reduced portions 232, 326 of the walls 218, 314 of the respective support structures 204 and 304. In the illustrated example, the first surface 406 of the tool base 402 is substantially flat and has a rectangular profile or shape. The second portion 408 of the example tool base 402 has a cylindrical shaped body 410 defining an outer diameter substantially equal to the inner diameter of the non-reduced portions 323, 326 of the respective walls 218, 314. The second portion 408 is raised or elevated relative to the first portion 406 a height substantially equal to a length of the non-reduced portion 232, 326 of the walls 218, 314. The second portion 408 of the illustrated example includes one or more alignment pins 412 (e.g., alignment pins) to engage respective apertures of the base mandrel 404 to help align the base mandrel 404 and the tool base 402 when the base mandrel 404 is coupled to the tool base 402 as shown in FIG. 4A. In addition, the base mandrel 404 is coupled to the tool base 402 to define the reduced portions 230, 328 of the respective walls 218, 314. In other words, the base mandrel 404 has a shape or profile complementary to the shape or profile of the reduced portions 230, 328 of the respective walls 218, 314. In particular, the example base mandrel 404 of the illustrated example has a size that is smaller than a size of the second portion 408 of the tool base 402. For example, the base mandrel 404 of the illustrated example has an outer diameter that is smaller than the outer diameter of the second portion 408 of the tool base 402 such that an interface 414 between the second portion 408 of the tool base 402 and the base mandrel 404 defines a mold line 416 (e.g., an outer mold line) that defines the shoulders 234, 330 of the respective support structures 204 and 304.

Figure 5:
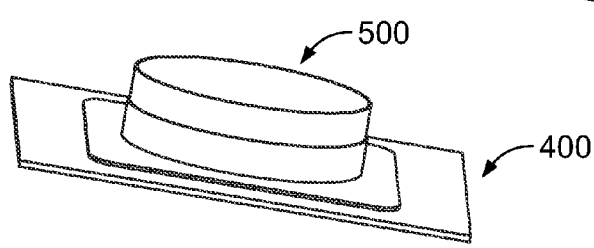
FIG. 5 illustrates plies of material applied to the example bond tool assembly of FIGS. 4A and 4B.

FIG. 5 illustrates a plurality of plies or a layup 500 positioned over the bond jig 400 to form the support structure base 600. Referring to FIG. 5, the layup 500 is formed by placing plies (e.g., laminated plies) of a resin on the tool base 402 and the base mandrel 404. For example, the laminated plies of the illustrated example may be a reinforced synthetic resin, such as a fiber reinforced epoxy. For example, multiple plies of fiber reinforced, uncured or semi-cured resin are successively laid up over the tool base 402 and the base mandrel 404. The layup 500 of the illustrated example is cured via vacuum bagging and/or autoclaving manufacturing techniques. Following the cure cycle, the support structure base 600 of FIG. 6 is formed and removed from the tool base 402 and the base mandrel 404 is removed from the tool base 402.

FIG. 6 illustrates the support structure base 600. The support structure base 600 may be used to form the example support structure 204 or the support structure 304. For example, the support structure base 600 defines the flange 220, the wall 218, 314, the bottom surfaces 222 (absent the openings 226), the cavity 224, the reduced wall portion 230, the non-reduced wall portion 232, and the shoulder 234 of the example support structure 204. The support structure base 600 of the illustrated example also defines the flange 316, the wall 314, the bottom surface 318 (absent the openings 322), the cavity 320, the reduced wall portion 328, the non-reduced wall portion 326, and the shoulder 330 of the example support structure 304.

Figure 7:
FIG. 7 illustrates an example first assembly jig that is used to construct the example radar assembly of FIGS. 2A and 2B.

FIG. 7 illustrates an example assembly jig 700 for forming and/or assembling the example radar assembly 200 of FIGS. 2A and 2B. More specifically, in some examples, the example assembly jig 700 may be used to form the respective openings 226 of the support structure 204. Alternatively, the example assembly jig 700 may be used as a support when forming the radome 206 and/or when assembling the radar assembly 200 (e.g., attaching the support structure 204 and the radome 206).

The example assembly jig 700 of FIG. 7 includes the tool base 402 and a first part mandrel 702. The part mandrel 702 has a shape or profile substantially similar to the shape or profile of the base mandrel 404 of FIGS. 4A and 4B. In other words, the part mandrel 702 of the illustrated example has a diameter and height that is substantially similar (e.g., within a certain manufacturing tolerance) or identical to the diameter and height of the base mandrel 404 of FIGS. 4A and 4B. However, the part mandrel 702 of the illustrated example includes one or more apertures or openings 704 that are sized, shaped and/or which correspond to the number of lands 210 (e.g., a profile, contours, etc.) of the example antenna module 202. Thus, the part mandrel 702 has a surface 706 complementary to the surface 212 of the antenna module 202. The openings 704 are sized to at least partially receive (e.g., matably receive) the lands 210 of the antenna module 202. To this end, the openings 704 receive the lands 210 with a relatively tight fit to prevent and/or restrict movement (e.g., lateral or side-to-side movement) of the antenna module 202 relative to the support structure 204 during assembly. In other words, the part mandrel 702 helps prevent and/or restrict canting of the antenna module 202 relative to the support structure 204 (e.g., the bottom surface 222) during assembly of the radar assembly 200 and/or manufacture of the radome 206. Also, the part mandrel 702 accommodates (e.g., has a shape or profile complementary to the shape or profile of) the reduced portion 230 of the walls 218. In particular, the example part mandrel 702 of the illustrated example has a size (e.g., a diameter) that is smaller than the size (e.g., the diameter) of the second portion 408 of the tool base 402. Additionally, the part mandrel 702 of the illustrated example includes apertures (e.g., partially recessed apertures or bores) to receive the pins 412 of the tool base 402 to align the part mandrel 702 with the tool base 402.

Figure 8:
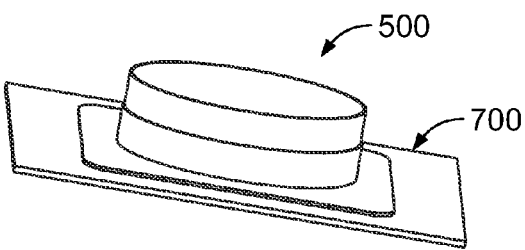
FIG. 8 illustrates plies of material applied to the example first assembly jig of FIG. 7.

FIG. 8 illustrates the support structure base 600 of FIG. 6 positioned over the assembly jig 700. When the part mandrel 702 is positioned on the tool base 402, the support structure base 600 is positioned over the part mandrel 702 such that the bottom surface 222 of the support structure base 600 is positioned adjacent the part mandrel 702. In other words, the flange 210 of the support structure base 600 engages the first portion 406 of the tool base 402 and the bottom surface 222 of the support structure base 600 engages the surface 706 of the part mandrel 702 as shown, for example, in FIG. 8. In this manner, the part mandrel 702 supports the bottom surface 222 of the support structure base 600 when the support structure base 600 is positioned on the assembly jig 700. With the part mandrel 702 supporting the bottom surface 222, the openings 226 may be formed in the support structure base 600 to form the example support structure 204 of FIGS. 2A and 2B. The openings 704 of the part mandrel 702 may provide a guide when forming the openings 226. The openings 226 may be formed via trimming, drilling, cutting, and/or any other manufacturing process(es).

Figure 9:
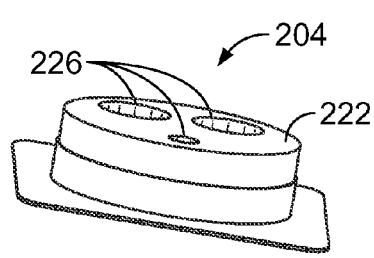
FIG. 9 illustrates an example support structure of the example radar assembly of FIGS. 2A and 2B that may be formed by the example first assembly jig of FIG. 7.

FIG. 9 illustrates the support structure 204 of FIGS. 2A and 2B formed by the support structure base 600 when positioned over the assembly jig 700 using the tool base 402 and the part mandrel 702. Alternatively, in other examples, the openings 226 in the bottom surface 222 of the support structure base 600 may be formed without the use of the part mandrel 702. In other words, the part mandrel 702 is not needed to drill or otherwise form the openings 226. In some examples, the openings 226 are formed in the support structure base 600 without the use of the assembly jig 700.

Figure 10:
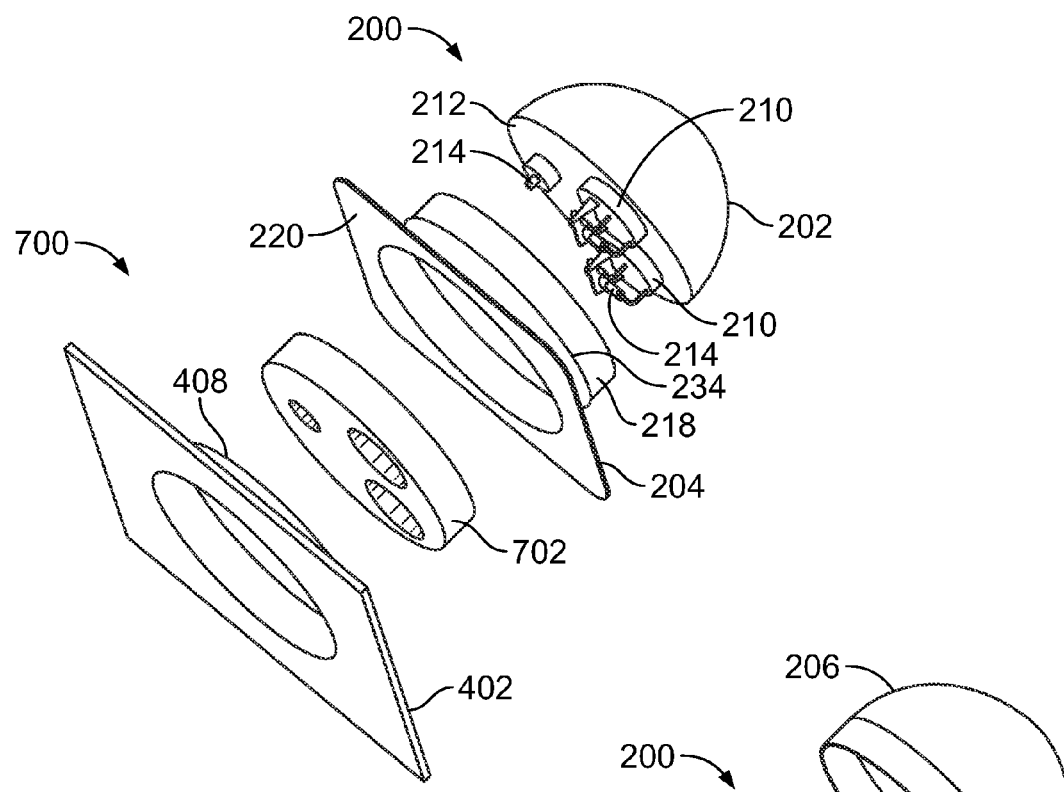
FIG. 10 illustrates the example first assembly jig of FIG. 7 being used to fabricate a radome of the example radar assembly of FIGS. 2A and 2B.

FIG. 10 illustrates forming the radome 206 using the assembly jig 700 of FIG. 7 (e.g., the tool base 402 and the part mandrel 702). As noted above, the part mandrel 702 may not be needed to form the openings 226 and may only be employed to facilitate assembly of the radar assembly 200 and/or form the radome 206. After the support structure 204 is formed, the part mandrel 702 is positioned on the tool base 402. The support structure 204 is positioned over the part mandrel 702 and the tool base 402 such that the part mandrel 702 supports the support structure 204 and, in particular, the bottom surface 222 of the support structure 204. The antenna module 202 is then coupled or positioned over the support structure 204 such that the lands 210 of the antenna module 202 are at least partially received within the respective openings 226 of the support structure 204. In other words, the surface 212 of the antenna module 202 engages or directly contacts the bottom surface 222 of the support structure 204. In addition, the apertures 706 of the part mandrel 702 are also configured to at least partially receive the lands 210 of the support structure 204 when the antenna module 202 is positioned over the support structure 204. The part mandrel 702 and the second portion 408 of the tool base 402 support the bottom surface 222 and/or the wall 218 from damage or collapsing when the antenna module is positioned on the support structure 204.

With the antenna module 202 positioned over the support structure 204, the radome 206 is formed by laying up plies of material over the support structure 204 and the antenna module 202. For example, plies formed of uncured or semi-cured fabric or fiberglass material may be positioned over the support structure 204 and the antenna module 202 while the support structure 204 and the antenna module 202 are supported by the assembly jig 700. An adhesive may be provided on the offset portion 236 of the antenna module 202 and/or the reduced portion 230 of the support structure 204 to help attach the radome 206 to the support structure 204. The tool base 402, the part mandrel 702, the antenna module 202 and the plies defining the radome 206 may be vacuum bagged to compact the radome plies and the radome plies may be cured via, for example, autoclaving to form the radome 206 and/or the radar assembly 200. The radar assembly 300 is then removed from the tool base 402 and the part mandrel 702.

Figure 11:
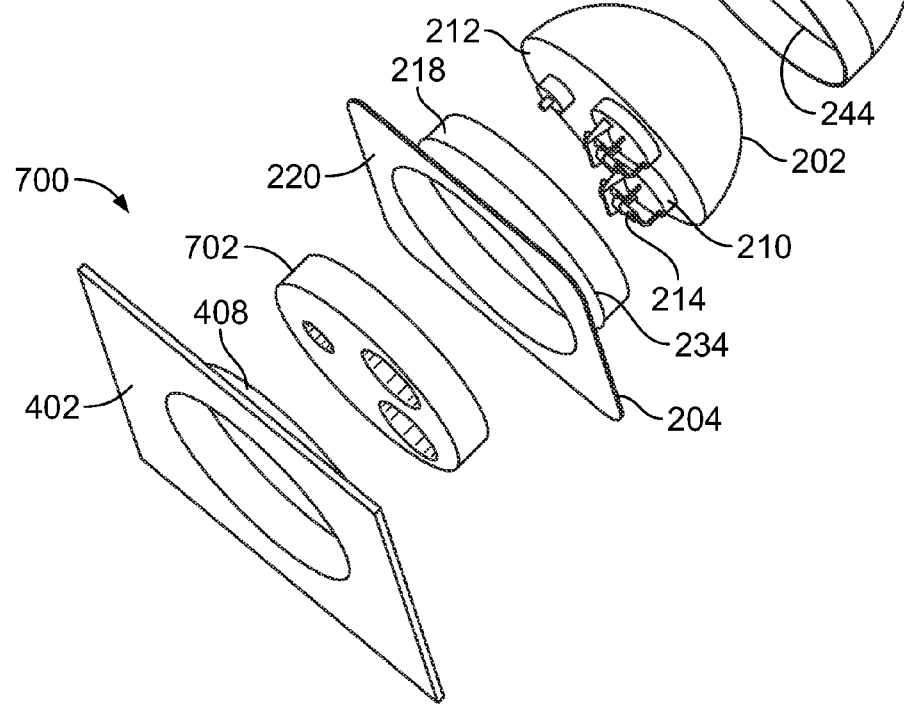
FIG. 11 illustrates the example first assembly jig of FIG. 7 being used to assemble the example radar assembly of FIGS. 2A and 2B.

FIG. 11 is an exploded view of the example radar assembly 200 being assembled using the assembly jig 700 of FIG. 7 (e.g., the tool base 402 and the part mandrel 702). Alternatively, the radome 206 is manufactured prior to assembly using any conventional manufacturing techniques and is not formed with the example tool base 402 and the part mandrel 702 disclosed herein. The support structure 204, the antenna module 202 and the radome 206 are positioned over the assembly jig 700. The assembly jig 700 with the support structure 204, the antenna module 202 and the radome 206 are vacuum bagged and/or bonded via autoclaving (e.g., at elevated temperatures sufficient to bond the support structure 204, the antenna module 202, and the radome 206 assembly) to provide the radar assembly 200.

Figure 12:
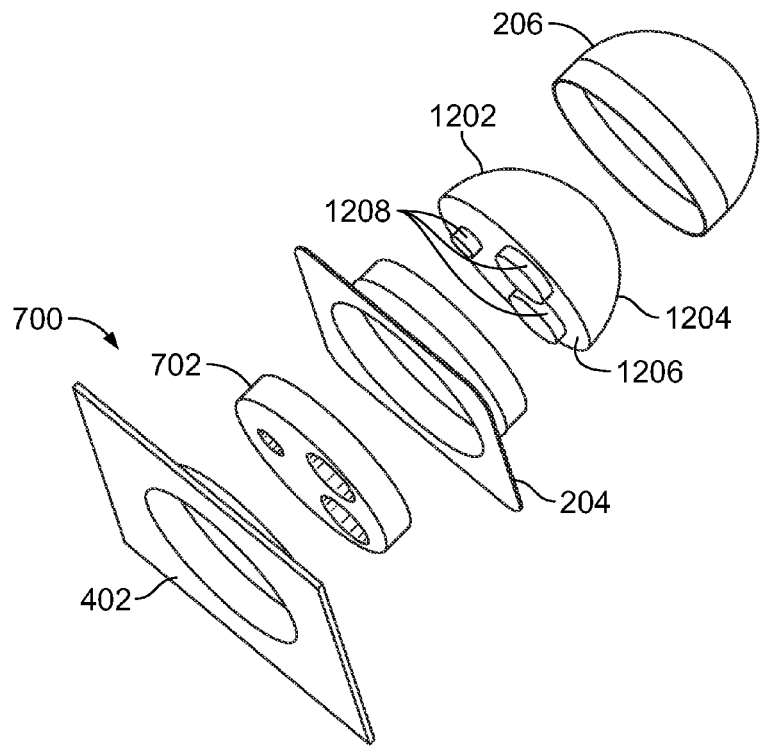
FIG. 12 illustrates the example first assembly jig of FIG. 7 and an example antenna module insert to fabricate a radome of the example radar assembly of FIGS. 2A and 2B.

FIG. 12 illustrates an alternative example to form or fabricate the radome 206. In particular, an antenna module insert 1202 is used to manufacture and/or form the radome 206 instead of the antenna module 202 shown in FIGS. 10 and 11. The antenna module insert 1202 of the illustrated example is representative of (e.g., is a model or mock-up of) the example antenna module of FIGS. 2A and 2B. For example, the antenna module insert 1202 of the illustrated example has a body 1204, a surface 1206 and raised lands 1208 extending from the surface 1206. The antenna module insert 1202 may be used instead of the antenna module 202 when the radome 206 is composed of material that requires curing using temperatures that are greater than a maximum allowable temperature that the antenna module 202 (e.g., the electronic components 214 or avionics) can withstand. Thus, the tool base 402, the part mandrel 702, the support structure 204, the antenna module insert 1202 and radome plies may be bagged, vacuumed and/or cured (e.g., via autoclaving) to form the radome 206. After curing (and cooling), the example radome 206 is removed and the antenna module insert 1202 is replaced with the antenna module 202. The antenna module 202 is positioned over the support structure 204, which is positioned over the assembly jig 700. The radome 206 is then positioned over the antenna module 202 and is attached to the support structure 204. For example, the radome 206, the antenna module 202 and the support structure 204 may be bonded, coupled and/or cured using an out of autoclave curing technique that allows the radar assembly 200 to bond at room temperature.

Figure 13:
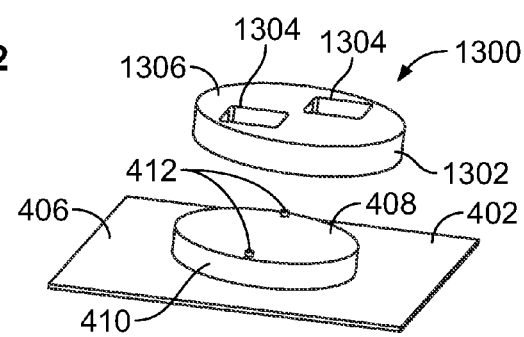
FIG. 13 illustrates a second example assembly jig that is used to construct the example radar assembly of FIGS. 3A and 3B.

FIG. 13 illustrates an example assembly jig 1300 for forming and/or assembling the example radar assembly 300 of FIGS. 3A and 3B. More specifically, in some examples, the example assembly jig 1300 may be used to form the respective openings 322 of the support structure 304. Alternatively, the example assembly jig 1300 may be used as a support when forming the radome 306 and/or when assembling the radar assembly 300 (e.g., attaching the support structure 304 and the radome 306).

The example assembly jig 1300 of FIG. 13 includes the tool base 402 and a second part mandrel 1302. Thus, in the illustrated example, the part mandrel 1302 is interchangeable with the part mandrel 702 of FIG. 7. Thus, the tool base 402 can receive the part mandrel 702 to accommodate the example antenna module 202 or the part mandrel 1302 to accommodate the example antenna module 302. The part mandrel 1302 of the illustrated example has a shape or profile substantially similar to the shape or profile of the base mandrel 404 of FIGS. 4A and 4B. In other words, the part mandrel 1302 of the illustrated example has a diameter and height that is substantially similar (e.g., within a certain manufacturing tolerance) or identical to the diameter and height of the base mandrel 404 of FIGS. 4A and 4B. However, the part mandrel 1302 of the illustrated example includes one or more apertures or openings 1304 that are sized, shaped and/or correspond to the number of lands 310 of the example antenna module 302. Thus, the part mandrel 1302 has a surface 1306 complementary to the surface 324 of the antenna module 302. The openings 1304 are sized to at least partially receive (e.g., matably receive) the lands 310 of the antenna module 302. Thus, as shown, the part mandrel 1302 has two rectangular openings 1304. The openings 1304 receive the lands 310 with a relatively tight fit to prevent and/or restrict movement (e.g., lateral or side-to-side movement) of the antenna module 302 relative to the support structure 304 during assembly. In other words, the part mandrel 1302 helps prevent and/or restrict canting of the antenna module 302 relative to the support structure 304 (e.g., the bottom surface 318) during assembly of the radar assembly 300 and/or fabrication of the radome 306. Also, the part mandrel 1302 accommodates (e.g., has a shape or profile complementary to the shape or profile of) the reduced portion 328 of the walls 314. In particular, the example part mandrel 1302 of the illustrated example has a size (e.g., a diameter) that is smaller than the size (e.g., the diameter) of the second portion 408 of the tool base 402. Additionally, the part mandrel 1302 of the illustrated example includes apertures (e.g., partially recessed apertures or bores) to receive the pins 412 of the tool base 402 to align the part mandrel 1302 with the tool base 402. Thus, in some examples, the part mandrel 1302 is substantially similar or identical to the part mandrel 702 except for the shapes of the openings 704 and 1304.

Figure 14:
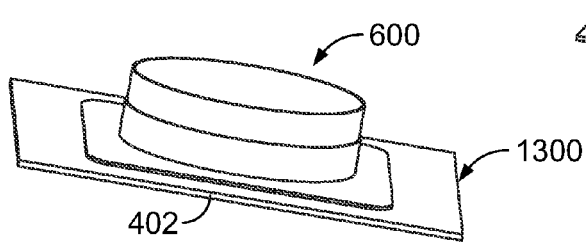
FIG. 14 illustrates plies of material applied to the example second assembly jig of FIG. 13.

FIG. 14 illustrates the support structure base 600 of FIG. 6 positioned over the assembly jig 1300 to form the openings 322 in the bottom surface 318 of the support structure 304. With the part mandrel 1302 supporting the bottom surface 318, the openings 1304 may be formed in the support structure base 600 to form the example support structure 304 of FIGS. 3A and 3B. The openings 1304 of the part mandrel 702 may provide a guide when forming the openings 322. The openings 226 may be formed via trimming, drilling, cutting, and/or any other manufacturing process(es).

Figure 15:
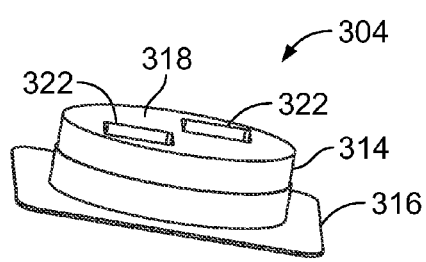
FIG. 15 illustrates an example support structure of the example radar assembly of FIGS. 3A and 3B that may be formed by the example second assembly jig of FIG. 13.

FIG. 15 illustrates the support structure 304 of FIGS. 3A and 3B formed by the support structure base 600 when positioned over the assembly jig 1300 using the tool base 402 and the part mandrel 1302. Alternatively, in other examples, the openings 322 in the bottom surface 318 of the support structure base 600 may be formed without the use of the part mandrel 1302. In other words, the part mandrel 1302 is not needed to drill or otherwise form the openings 322. In some examples, the openings 322 are formed in the support structure base 600 without the use of the assembly jig 1300.

Figure 16:
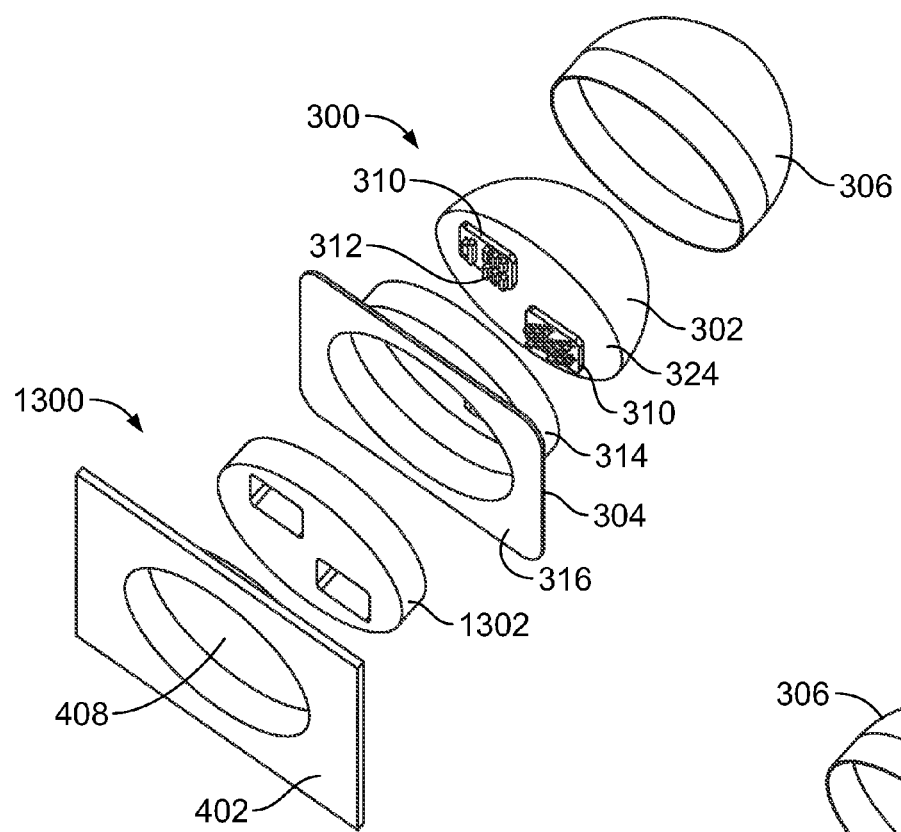
FIG. 16 illustrates the example second assembly jig of FIG. 13 used to fabricate a radome of the example radar assembly of FIGS. 3A and 3B and/or assemble the example radar assembly of FIGS. 3A and 3B.

FIG. 16 is an exploded view of the example radar assembly 300 and the assembly jig 1300. The support structure 304 is positioned over and/or supported by the part mandrel 1302 to form and/or assemble the radome 306 with the support structure 304. The part mandrel 1302 supports the antenna module 302, the support structure 304 and/or the radome 306 during formation of the radome 306 and/or during assembly of the radar assembly 300 similar to the assembly jig 700 described above. For example, the assembly jig 1300 may be used to form the radome 306 by applying radome plies over the antenna module 302 when the antenna module 302 is positioned on the support structure 304 and the assembly jig 1300. Alternatively, the assembly jig 1300 may be used to assemble the radar assembly 300 when the radome 306 is pre-fabricated.

Figure 17:
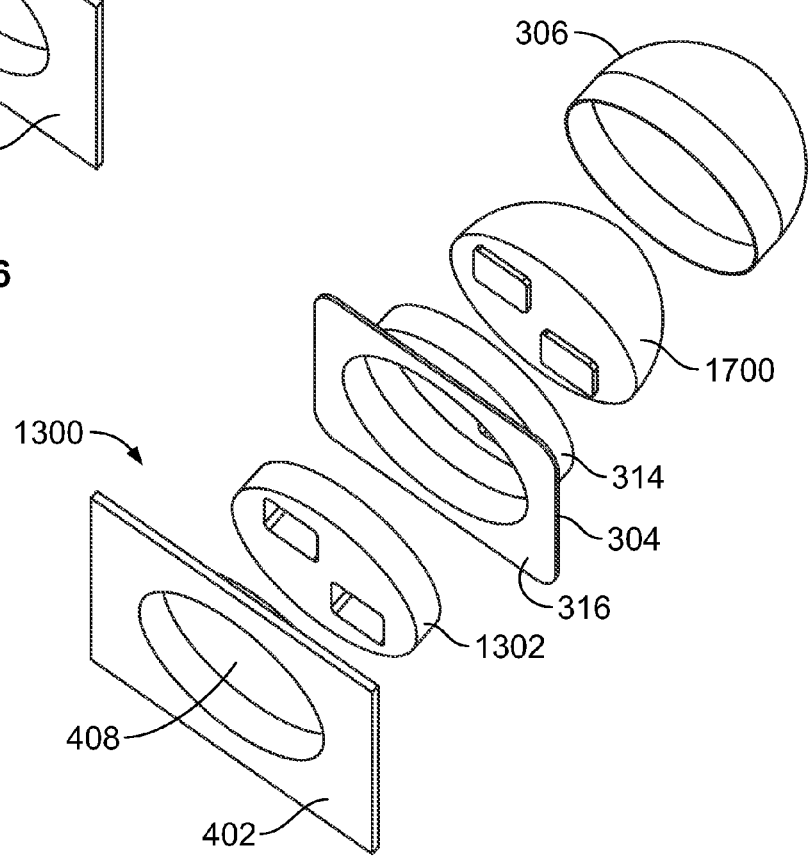
FIG. 17 illustrates the example second assembly jig of FIG. 13 and another example antenna module insert used to fabricate a radome of the example radar assembly of FIGS. 3A and 3B.

FIG. 17 illustrates an example antenna module insert 1700 that may be used in place of the antenna module 302 when forming and/or curing the radome 306. The antenna module insert 1700 is representative of (e.g., is a model or mock-up of) the antenna module 302 and is shaped, sized and/or provided with substantially similar or identical dimension relative to the antenna module 302. The antenna module insert 1700 is then replaced with the antenna module 302 and the support structure 304 and the antenna module 302 and the radome 306 are bonded together (e.g., via out of autoclaving technique(s)) to form the radar assembly 300.

The tool base 402, the base mandrel 404, the part mandrels 702, 1302, and/or the antenna insert modules 1202, 1700 may be formed of any rigid material(s) such as, for example, a metallic alloy. Further, in some examples, the tool base 402, the base mandrel 404, the part mandrels 702, 1302, and/or the antenna insert modules 1202, 1700 may be formed or composed of materials having similar or closely matched coefficients of thermal expansion. For example, the tool base 402, the base mandrel 404, the part mandrels 702, 1302, and/or the antenna insert modules 1202, 1700 may be formed of a nickel-iron (FeNi) metal alloy such as, for example, Invar®.

Figure 18:
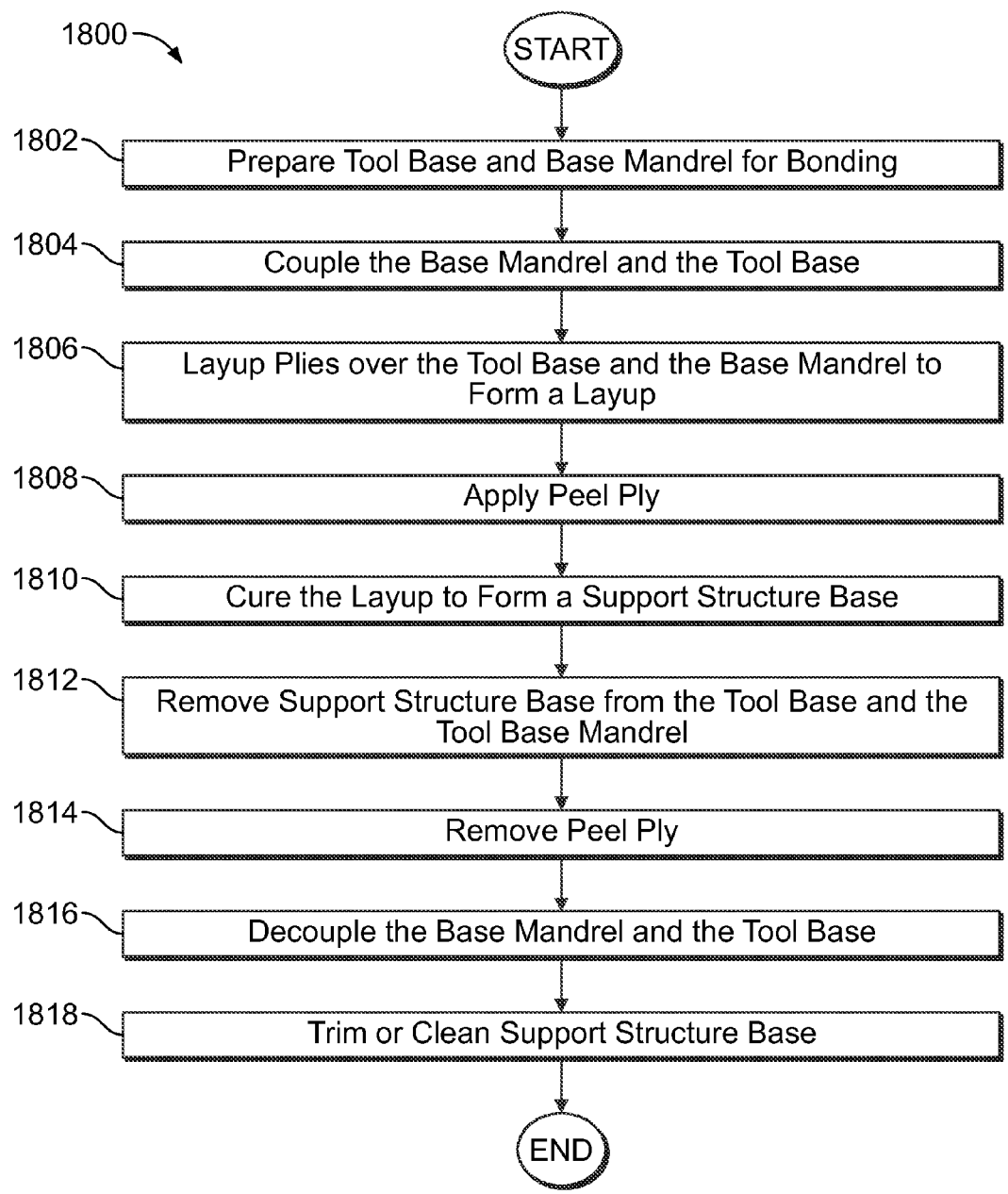
FIGS. 18-20 are flowcharts of example methods that may be used to fabricate the example radar assembly of FIGS. 2A and 2B or the example radar assembly of FIGS. 3A and 3B.
Figure 19:
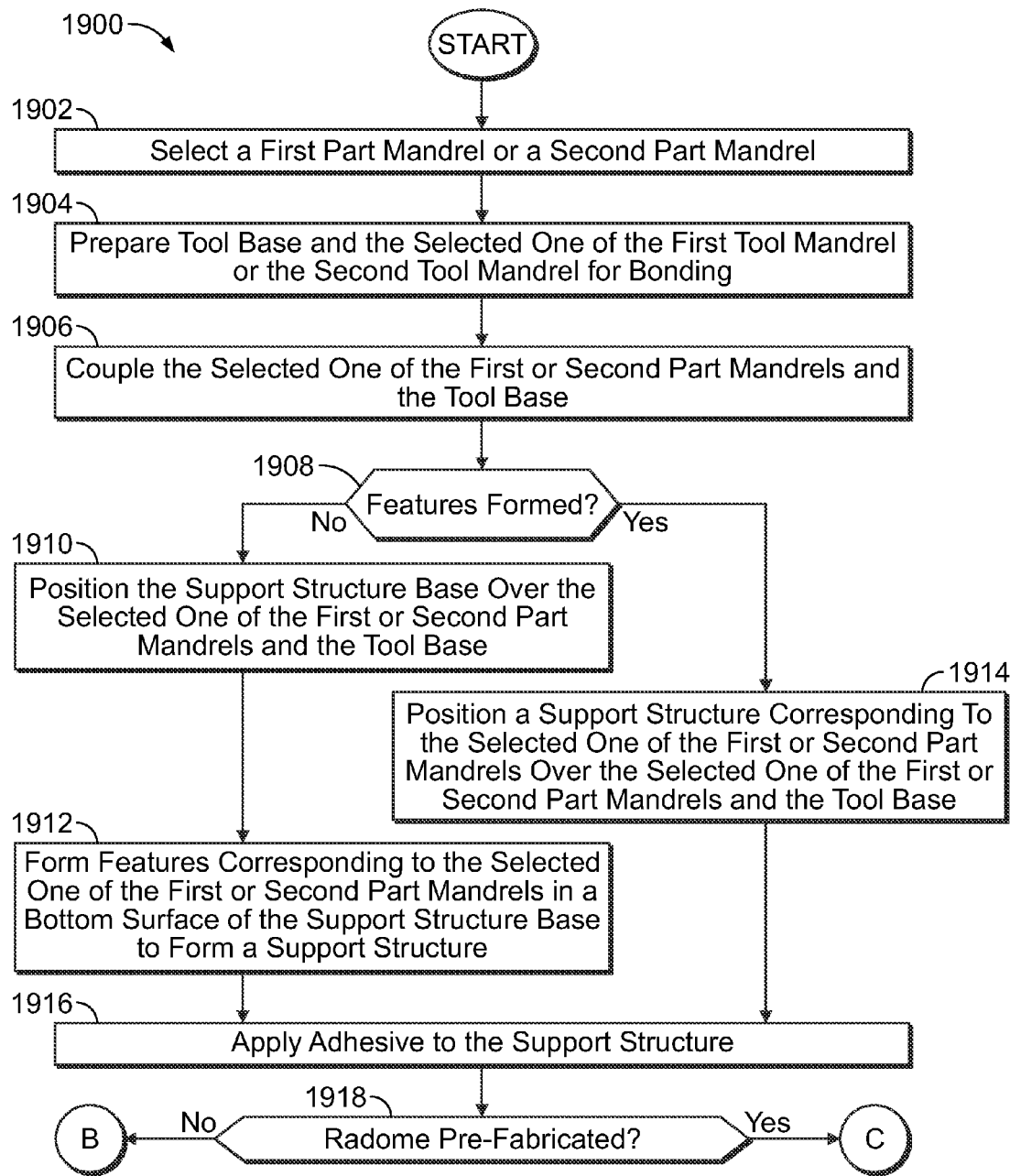
Figure 20:
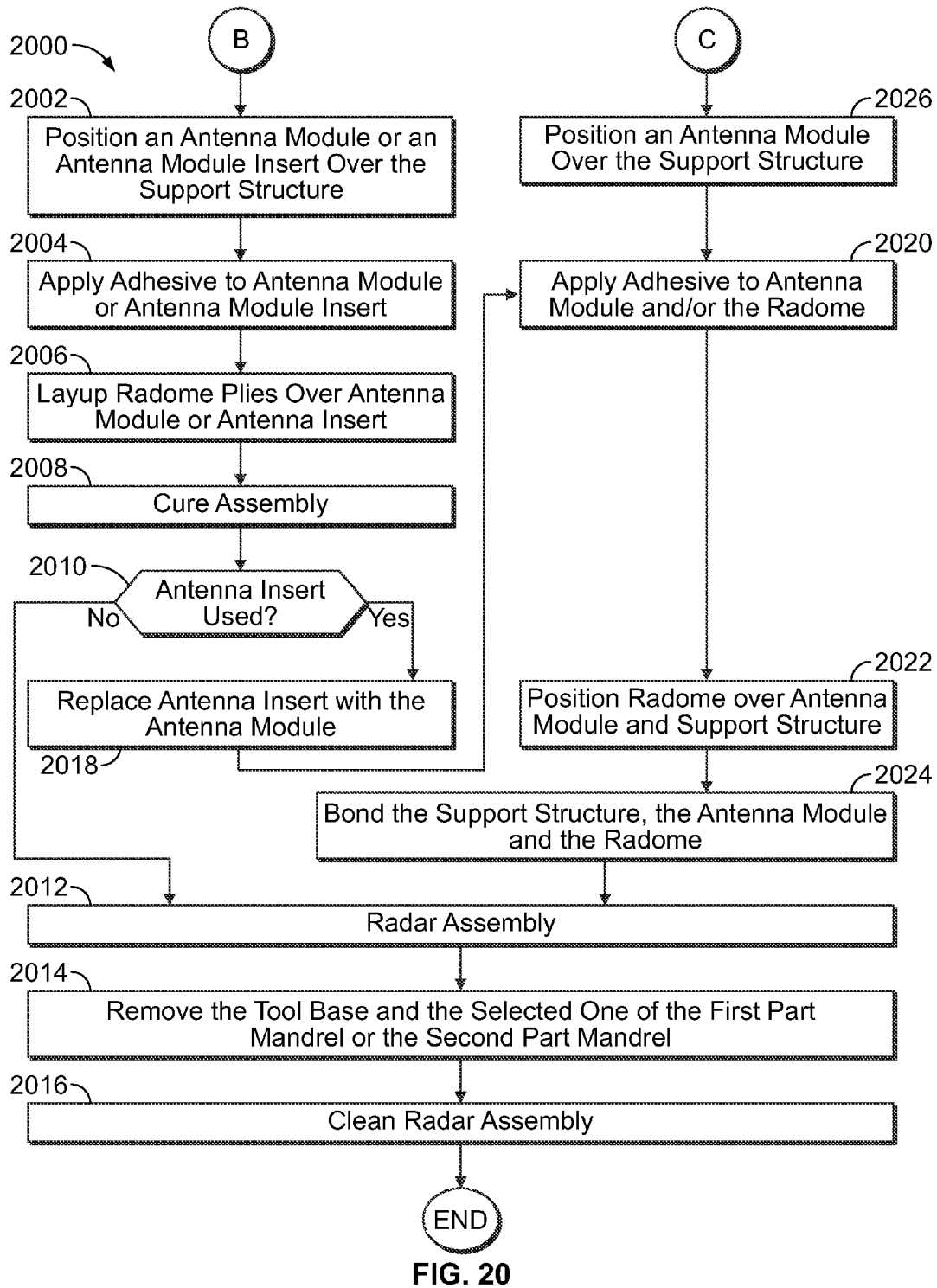

FIGS. 18-20 are flowcharts of example methods 1800-2000 that may be used to fabricate an example radar assembly such as the example radar assemblies 200 and 300 disclosed herein using the example bond jig 400, the assembly jig 700 and/or the example assembly jig 1300 disclosed herein. While the example methods 1800-2000 may be used to assemble an example radar assembly for use, for example, with the aircraft 100 described herein, one or more of the blocks and/or processes illustrated in FIGS. 18-20 may be combined, divided, re-arranged, omitted, eliminated and/or implemented in any other way. Further still, the example methods of FIGS. 18-20 may include one or more processes and/or blocks in addition to, or instead of, those illustrated in FIGS. 18-20, and/or may include more than one of any or all of the illustrated processes and/or blocks. Although the example methods 1800-2000 are described with reference to the flowcharts illustrated in FIGS. 18-20, many other methods of assembling the example radar assemblies 200 and 300 may alternatively be used.

FIG. 18 is a flowchart of an example method 1800 that may be used to fabricate an example support structure base such as the example support structure base 600 of FIG. 6 using the example bond jig 400 disclosed herein. The example method 1800 disclosed herein may begin by preparing the tool base 402 and the base mandrel 404 for a bonding operation (block 1802). For example, the tool base 402 and the base mandrel 404 may be cleaned and/or a coating of a mold release material may be applied to the surfaces of the tool base 402 (e.g., the first and second portions 406 and 408) and the base mandrel 404. The base mandrel 404 is then coupled to the tool base 402 (block 1804). For example, the alignment pins 412 receive apertures of the base mandrel 404 to align the base mandrel 404 and the tool base 402.

With the tool base 402 and base mandrel 404 assembled, a plurality of plies are laid up over the tool base 402 and the base mandrel 404 to form a layup (block 1806). For example, a layup of plies of reinforced resin such as, for example, fiber reinforced epoxy are applied on surfaces (e.g., outer surfaces and/or side surfaces) of the first and second portions 406 and 408 of the tool base 402 and over outer surfaces and/or side surfaces of the base mandrel 404. In some examples, a peel ply is applied to the layup (block 1808). For example, the peel ply is applied to the surfaces of the support structure base 600 and/or to the surfaces (e.g., the walls 218, 314, the reduced wall portions 230, 328, and/or the bottom surfaces 222, 318) of the support structure base 600 that will attach, engage, or couple to the antenna module 202, 302 and/or the radome 206, 306 mating surfaces. However, the peel ply may not be used in some examples. The layup is then cured to form the support structure base (block 1810). For example, the layup of block 1806 or 1808, including the bond jig 400 are vacuum bagged, compacted and cured via, for example, autoclaving to form the support structure base 600. The support structure base 600 is then removed from the tool base 402 and the base mandrel 404 (block 1812). The peel ply is then removed from the support structure base 600 (block 1814). Blocks 1802-1814 may be repeated to manufacture an additional support structure base 600. After completion, the base mandrel 404 is removed from the tool base 402 (block 1816). The support structure base 600 is cleaned and trimmed for post assembly operation(s) (block 1818). For example, the support structure base 600 may be formed with the openings 226 or 322 to define the support structure 204 or 304.

FIG. 19 illustrates an example method 1900 that may be used to assemble the example radar assembly 200 and 300 after the support structure base 600 is formed by the example method 1800 of FIG. 18. Alternatively, the example method 1900 of FIG. 19 also describes a method to assemble the example radar assembly 200 and 300 when the support structure base 600 is formed with the features (e.g., the openings 226 or 322) to provide the support structure 204 or 304 prior to the method 1900 described in FIG. 19.

The example method 1900 of FIG. 19 disclosed herein may begin by selecting the first part mandrel 702 or the second part mandrel 1302 (block 1902). For example, the first part mandrel 702 corresponds to the features (e.g., the lands 210 and/or the surface 212) of the antenna module 202 and the second part mandrel 1302 corresponds to the features (e.g., the lands 310 and/or the surface 324) of the antenna module 302. The tool base 402 and the selected one of the first part mandrel 702 or the second part mandrel 1302 are prepared for a bonding operation (block 1904). The selected first or second part mandrel 702 or 1302 is then coupled to the tool base 402. (block 1906). In other words, the selected first or second part mandrel 702 or 1302 is interchanged with the base mandrel 404.

As noted above, the features (e.g., the openings 226 or 322) of the support structure 204 or 304 may be formed using the selected first or second part mandrels 702 or 1302 or, alternatively, may be formed without the use of the first or second part mandrels 702 or 1302 (block 1908). If the features (e.g., the openings 226 or 322) are not formed at block 1908, the support structure base 600 is positioned over the selected one of the first or second part mandrels 702 or 1302 and the tool base 402 (block 1910). With the tool base 402 and the selected first or second part mandrel 702 or 1302 supporting the support structure base 600, the features (e.g., the openings 226 or 322) corresponding to the selected first or second part mandrel 702 or 1302 are formed in the bottom surface 222, 318 of the support structure base 600 to form the support structure 204 or the support structure 304. (block 1912). For example, the features may be formed via drilling, trimming and/or any other manufacturing process(es) or technique(s). The selected first or second part mandrel 702 or 1302 provides a guide to form the openings 226 or 322. Alternatively, if the features are formed at block 1908, the support structure 204 or the support structure 304 corresponding to the selected first or second part mandrel 702 or 1302 is positioned over the tool base 402 and the selected first or second part mandrel 702 or 1302 (block 1914).

Next, an adhesive is applied to the support structure 204 or 304 (block 1916). For example, the adhesive may be applied to the bottom surface 222, 318, the wall 218, 314, and/or any other surface of the support structure 204, 304. As noted above, the radome 206, 306 may be fabricated using the example assembly jigs 700 or 1300 disclosed herein or may be pre-fabricated using other manufacturing technique(s), process(es) and/or jig(s) (block 1918). If the radome is not pre-fabricated at block 1918, then the example method 2000 may be used. If the radome is pre-fabricated at block 1918, then the example method 2100 may be used.

FIG. 20 illustrates an example method 2000 that may be used to assemble the example radar assembly 200 or 300. If the radome 206 or 306 is not pre-fabricated, the example method 2000 begins by positioning the antenna module 202 or 302 or the antenna module insert 1202 or 1700 over the support structure 204 or 304 positioned over the assembly jig 700 or the assembly jig 1300 (block 2002). An adhesive may be applied to the surfaces of the antenna module 202 or 302 or the antenna module insert 1202 or 1700 (block 2004). Plies of radome material are then laid up over the antenna module 202 or 302 or the antenna module insert 1202 or 1700 to provide a radome layup (block 2006). The radome layup is then cured to form the radome 206 or 306 (block 2008). For example, the radome layup, the antenna module 202 or 302 or the antenna module insert 1202 or 1700, the support structure 204 or 304, the first or second part mandrel 702 or 1302, and the tool base 402 are vacuum bagged, compacted and/or cured to bond or form the radome 206 or 306 via, for example, autoclaving or an out of autoclaving technique(s) or process(es).

For example, if the antenna module 202 or 302 is used at block 2002 (block 2010), the curing process at block 2008 forms the radar assembly 200 or 300 (block 2012). The tool base 402 and the selected first or second part mandrels 702 or 1302 are removed from the radar assembly 200 or 300 (block 2014). The radar assembly 200 or 300 may then be cleaned or further processed (block 2016).

If the antenna module insert 1202 or 1700 is used at block 2002 (block 2010), the antenna module insert 1202 or 1700 is replaced with one of the antenna modules 202 or 302 after the curing process of block 2008 (block 2018). For example, after the curing process of block 2008, the radome 206 or 306 is formed and is removed from the antenna module insert 1202 or 1700 while the support structure 204 or 304 remains positioned over the tool base 402 and the first or second part mandrels 702 or 1302. In this manner, the radome layup may be cured at temperatures that are greater than a maximum allowable temperature that the antenna module 202 or 302 (e.g., the electrical components 214 or 312) can withstand before causing damage the components 214 or 312 of the antenna module 202 or 302.

An adhesive may then be applied to the antenna module 202 or 302 and/or the radome 206 or 306 (block 2020). For example, adhesive may be applied to the surface 212 or 324, the surface of the body 208 or 308, an inner surface of the radome 206 or 208, the marginal area 236 of the radome 206 or 306, and/or any other surfaces of the radar assembly 200 or 300. The radome 206 or 306 is then positioned over the antenna module 202 or 302 (block 2022). The radome 206 or 306, the support structure 204 or 304, the antenna module 202 or 302, the first or second part mandrel 702 or 1302 and the tool base 402 undergo a bonding or curing process(es) (block 2024), thereby forming the radar assembly 200 or 300 (block 2012). The tool base 402 and the selected first or second part mandrel 702 or 1302 are removed from the radar assembly 200 or 300 (block 2014) and the radar assembly 200 or 300 is cleaned or prepped for further processing (block 2016). For example, the bonding or curing of block 2024 may be provided via an out of autoclaving manufacturing process(es) such that the radar assembly 200 or 300 is cured or bonded at, for example, room temperature or any other temperature that is less than a maximum allowable temperature that the antenna module 202 or 302 (e.g., the electronic components 214 or 312, the avionics, etc.) can withstand.

Alternatively, if the radome 206 or 306 is pre-fabricated (block 1918 of FIG. 19), the antenna module 202 or 302 is positioned over the support structure 204 or 304 (block 2026). Adhesive is then applied to the surfaces of the antenna module 202 or 302 and/or the surfaces of the pre-fabricated radome 206 or 306 (block 2020). The radome 206 or 306 is then positioned over the antenna module 202 or 302 and the support structure 204 or 304 (block 2022). The radome 206 or 306, the support structure 204 or 304, the antenna module 202 or 302, the first or second part mandrel 702 or 1302 and the tool base 402 undergo a bonding or curing process(es) (block 2024), thereby forming the radar assembly (block 2012). The tool base 402 and the selected first or second part mandrel 702 or 1302 are removed from the radar assembly 200 or 300 (block 2014) and the radar assembly 200 or 300 is cleaned or prepped for further processing (block 2016).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   coupling a base mandrel to a tool base to form a support structure base;
   removing the base mandrel from the tool base after the support structure base is formed;
   selecting a first part mandrel or a second part mandrel, the first part mandrel having one or more first features corresponding to a first radar assembly and the second part mandrel having one or more second features corresponding to a second radar assembly;
   coupling the selected first part mandrel or the second mandrel with the base mandrel; and
   positioning the support structure base over the selected first part mandrel when the first part mandrel is positioned on the tool base or the second part mandrel when the second part mandrel is positioned on the tool base.

2. The method of claim 1, further comprising forming the support structure base by laying up material over the base mandrel and the tool base and curing the layup to form the support structure base.

3. The method of claim 1, further comprising modifying the support structure base to provide a first support structure for use with the first radar assembly when the first part mandrel is selected or a second support structure for use with the second radar assembly when the second part mandrel is selected.

4. The method of claim 3, wherein modifying the support structure base to provide the first support structure or the second support structure includes forming one or more features in a bottom surface of the support structure base corresponding to the one or more first features provided by the selected first part mandrel or the one or more second features provided by the selected second part mandrel.

5. The method of claim 3, further comprising positioning a first antenna module insert on the first support structure or a second antenna module insert on the second support structure.

6. The method of claim 5, further comprising laying up radome plies over the first support structure and the first antenna module insert to provide a first radome layup or laying up radome plies over the second support structure and the second antenna module insert to form a second radome layup.

7. The method of claim 6, further including curing the first radome layup to form a first radome or curing the second radome layup to form a second radome.

8. The method of claim 7, further including:
   removing the first radome from the first antenna module insert or removing the second radome from the second antenna module insert;
   replacing the first antenna module insert with a first antenna module or replacing the second antenna module insert with a second antenna module;
   positioning the first radome over the first antenna module and the first support structure or positioning the second radome over the second antenna module and the second support structure; and
   bonding the first radome and the first support structure while the first radome, the first antenna module and the first support structure being positioned over the tool base and the first part mandrel, wherein the first antenna module, the first support structure, and the first radome provide the first radar assembly, or bonding the second radome and the second support structure while the second radome, the second antenna module and the second support structure are positioned over the tool base and the second part mandrel, wherein the second antenna module, the second support structure and the second radome provide the second radar assembly.

9. The method of claim 3, further comprising selecting a first antenna module corresponding to the first support structure or a second antenna module corresponding to the second support structure.

10. The method of claim 9, further comprising positioning the first antenna module on the first support structure or the second antenna module on the second support structure.

11. The method of claim 10, further comprising laying up radome plies over the first support structure and the first antenna module or the second antenna module and the second antenna module and curing the radome plies to form a radome.

12. The method of claim 10, further comprising positioning a radome on the first antenna module and the first support structure or the second antenna module and the second support structure.

13. The method of claim 12, further comprising bonding the radome, the first antenna module and the first support structure to form the first radar assembly, or bonding the radome, the second antenna module and the second support structure to form the second radar assembly.

14. The method of claim 10, further comprising:
positioning a first radome over the first antenna module and the first support structure, or positioning a second radome over the second antenna module and the second support structure; and
bonding the first radome and the first support structure, the first antenna module and the first support structure to form the first radar assembly while the first radome, the first antenna module and the first support structure being positioned over the tool base and the first part mandrel, or bonding the second radome and the second support structure, wherein the second antenna module and the second support structure are to form the second radar assembly while the second radome, the second antenna module and the second support structure being positioned over the tool base and the second part mandrel.

15. A method comprising:
positioning a base mandrel over a tool base;
laying up plies of material over the base mandrel and the tool base to form a support structure base layup;
curing the support structure base layup to form a support structure base, the support structure base to provide a first support structure of a first radar assembly or a second support structure of a second radar assembly;
removing the support structure base from the tool base and the base mandrel; interchanging the base mandrel with a first part mandrel or a second part mandrel; and
positioning the support structure base over the first part mandrel or the second part mandrel when the first part mandrel or the second part mandrel is coupled to the tool base.

16. The method of claim 15, further comprising:
forming one or more features in a bottom surface of the support structure base to form the first support structure of the first radar assembly when the first mandrel is positioned on the tool base, the one or more features corresponding to one or more features provided by the first part mandrel;
positioning a first antenna module over the first support structure;
positioning a first radome over the first antenna module and the first support structure; and
bonding the first radome, the first antenna module and the first support structure to form the first radar assembly.

17. The method of claim 15 further comprising:
forming one or more features in a bottom surface of the support structure base to form the second support structure of the second radar assembly when the second mandrel is positioned on the tool base, the one or more features corresponding to one or more features provided by the second part mandrel;
positioning a second antenna module over the second support structure;
positioning a second radome over the second antenna module and the second support structure; and
bonding the second radome, the second antenna module and the second support structure to form the second radar assembly.

18. A method comprising:
positioning a base mandrel over a tool base;
laying up plies of material over the base mandrel and the tool base to form a support structure base layup;
curing the support structure base layup to form a support structure base;
removing the support structure base from the tool base and the base mandrel;
removing the base mandrel from the tool base
coupling a part mandrel to the tool base and positioning the support structure base over the part mandrel and the tool base;
forming one or more features in a bottom surface of the support structure base to form a support structure of a radar assembly, the one or more features corresponding to one or more features provided by the part mandrel;
positioning an antenna module over the support structure;
positioning a radome over the antenna module and the support structure; and
bonding the radome, the antenna module and the support structure to form the radar assembly.

* * * * *